(12) United States Patent
Pleyer

(10) Patent No.: US 7,413,387 B2
(45) Date of Patent: Aug. 19, 2008

(54) PNEUMATIC DISTRIBUTOR OF GRANULAR AND/OR POWDERY MATERIALS, IN PARTICULAR FOR SOWING MACHINES

(75) Inventor: Peter Pleyer, Bad Essen (DE)

(73) Assignee: Gaspardo Seminatrici S.P.A., Morsano Al Tagliamento (PN) (IT)

( * ) Notice: Subject to any disclaimer, the term of this patent is extended or adjusted under 35 U.S.C. 154(b) by 0 days.

(21) Appl. No.: 10/569,189

(22) PCT Filed: Aug. 26, 2003

(86) PCT No.: PCT/IT03/00518

§ 371 (c)(1),
(2), (4) Date: Nov. 13, 2006

(87) PCT Pub. No.: WO2005/018302

PCT Pub. Date: Mar. 3, 2005

(65) Prior Publication Data

US 2007/0181048 A1    Aug. 9, 2007

(51) Int. Cl.
*A01C 7/00* (2006.01)
*A01C 9/00* (2006.01)
*B60P 1/60* (2006.01)
*B65G 51/18* (2006.01)
*B65G 53/48* (2006.01)

(52) U.S. Cl. .......................... 406/41; 406/67; 406/195; 111/174

(58) Field of Classification Search .................. 406/39, 406/41, 65, 67, 144, 146, 195, 138; 239/654, 239/655; 111/174–185, 170
See application file for complete search history.

(56) References Cited

U.S. PATENT DOCUMENTS 5,980,163 A   11/1999  Gregor et al.
2003/0133759 A1   7/2003  Winther

FOREIGN PATENT DOCUMENTS

GB   1165790   10/1969

OTHER PUBLICATIONS

International Search Report for PCT International Application No. PCT/IT03/00518.

*Primary Examiner*—Christopher J. Novosad
(74) *Attorney, Agent, or Firm*—RatnerPrestia

(57) ABSTRACT

A pneumatic distributor of granular and/or powdery materials includes a main distribution duct having a first end in the region of which an air-flow is injected into the duct under pressure, and a second end. The main duct includes respective adjacent converging-diverging portions, with reference to the direction of the air-flow, defining a Venturi duct. A dosing device is provided for delivering a metered quantity of material into the main duct in the region of the narrow cross-section of the Venturi duct, for the mixing of the material into the air-flow and the entrainment of the mixture obtained towards the second end. The distributor includes at least one auxiliary duct, bypassing the Venturi duct, in order to connect a section of the main duct disposed upstream of the Venturi duct to a section of the main duct disposed downstream of the Venturi duct.

5 Claims, 1 Drawing Sheet

PNEUMATIC DISTRIBUTOR OF GRANULAR AND/OR POWDERY MATERIALS, IN PARTICULAR FOR SOWING MACHINES

This application is a U.S. National Phase Application of PCT International Application PCT/IT2003/000518

TECHNICAL FIELD

The present invention relates to a pneumatic distributor of granular and/or powdery materials having a main distribution duct and dosing device.

BACKGROUND ART

Distributors of the type indicated are used particularly but not exclusively in the technical field of sowing machines with pneumatic seed transportation. In these applications, it is known to provide a seed-loading hopper to which a dosing device, for example, of the volumetric type, is fitted; the dosing device supplies metered quantities of seed into a Venturi duct (in short a "Venturi") by means of which the seed is introduced into an air-flow in a main duct of the distributor. The air-flow is generated by forced ventilation, for example, by means of a blower or similar air-pressurization means so as to convey the air and seed mixture towards the sowing regions in a jet.

The limitations imposed by the overall size of the distributor, which is dictated partly by the size of the components used as well as by the space offered by the machine equipped with the distributor, generally suggest the use of a Venturi having a narrow cross-section with a diameter no greater than preset values. However, these dimensional limitations of the Venturi duct penalize the utilization of the power deliverable by the blower that is used to produce the forced ventilation in the air flow; this power is thus only partially transferred to the air and seed mixture in the respective static and kinetic energy components, resulting in low efficiency and low flow-rates of material delivered in comparison with those that could theoretically be achieved with the power used.

BRIEF DESCRIPTION OF THE INVENTION

The main object of the invention is to provide a distributor which is designed structurally and functionally to overcome the limitations discussed with reference to the prior art mentioned.

This object is achieved by the invention by means of a distributor having a main distribution duct with a first end in the region of an air-flow which is injected into the duct under pressure, and a second end. The main duct has respective adjacent converging-diverging portions, with reference to the direction of the air-flow, defining a Venturi duct. A dosing device is provided for delivering a metered quantity of material into the main duct in the region of the narrow cross-section portion of the Venturi duct, for the mixing of the material into the air-flow and the enterment of the mixture obtained towards the second end. At least one auxiliary duct, bypassing the Venturi duct, is provided in order to connect a section of the main duct disposed upstream of the Venturi duct to a section of the main duct disposed downstream of the Venturi duct.

BRIEF DESCRIPTION OF THE DRAWINGS

Further characteristics and advantages of the invention will become clear from the following detailed description of a preferred embodiment thereof which is described by way of non-limiting example with reference to the appended drawings, in which.

PREFERRED EMBODIMENT OF THE INVENTION

Figure 1:
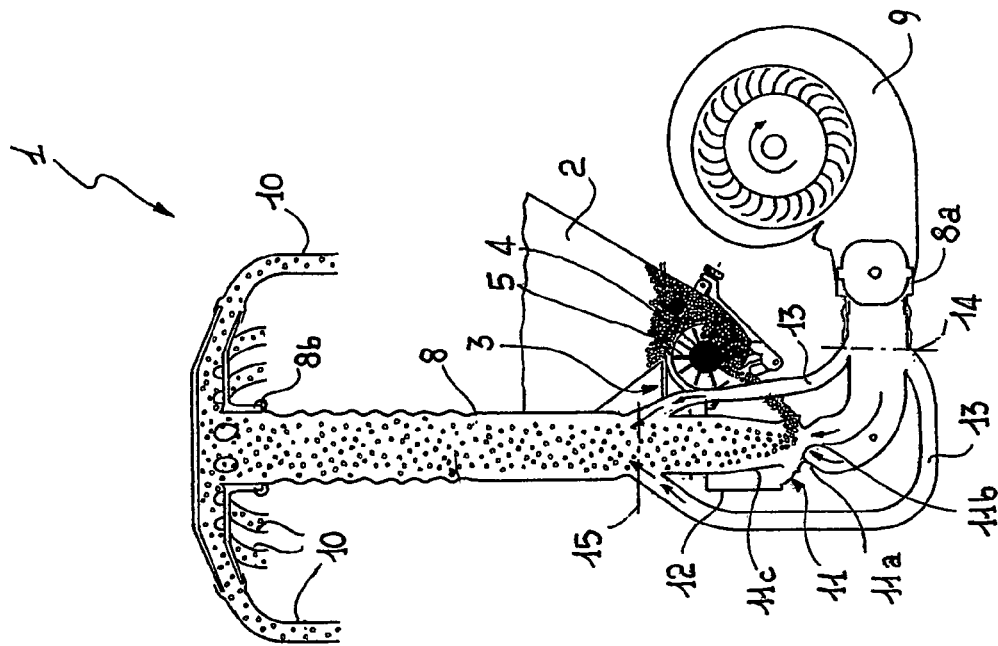
FIG. 1 is a schematic view of a distributor formed in accordance with the present invention.
Figure 2:
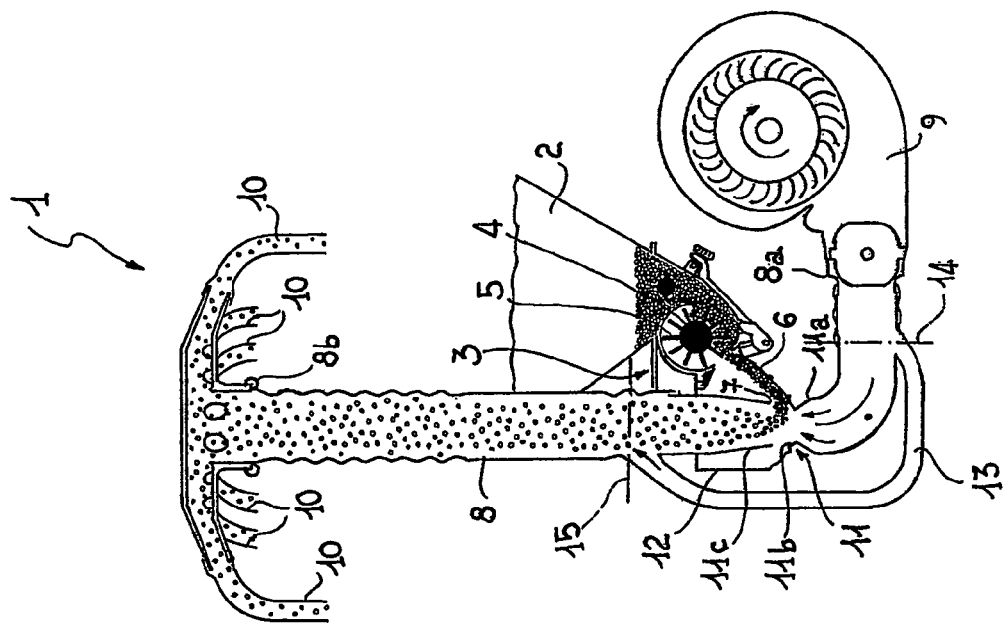
FIG. 2 is a view corresponding to that of FIG. 1, and showing a variant of the invention.

With initial reference to FIG. 1, a pneumatic distributor of granular and/or powdery materials, designed particularly for the distribution of cereal seeds and the like and formed in accordance with the invention, is shown schematically and generally indicated 1. The distributor may advantageously be arranged for mounting on a sowing machine of the known type produced by the Applicant.

The distributor 1 comprises a seed-loading hopper 2 on the base of which is fitted a volumetric dosing device 3 which has a roller 4 with blades 5 and which can deliver metered quantities of seeds in a continuous and calibrated flow of material. The flow is conveyed, by means of a chute 6 arranged beneath the dosing roller, into the vicinity of an opening 7 of a main duct 8 of the distributor for the pneumatic transportation of the seeds to the sowing regions, as will be explained in detail below. The main duct 8 has a first end 8a in the region of which it is connected to the output opening of a fan 9 or other similar blowing means suitable for producing a flow of air under pressure in the duct and a second, opposite end 8b from which suitable branches, all indicted 10, extend for the distribution of the material at a plurality of points.

A Venturi duct 11 is also defined in the main duct 8 and comprises a portion 11a which converges, with reference to the direction of the air-flow (from the end 8a towards the end 8b), an intermediate portion 11b with a narrow cross-section, and a diverging, output portion 11c of the Venturi. The opening 7 is formed in the main duct 8 in the region of the narrow cross-sectioned portion 11b, straddling the converging and diverging portions of the Venturi. As is well known, this intermediate, narrow cross-sectioned portion is the portion in which the air-flow passing through the Venturi has the greatest speed and the lowest pressure. It should be noted that the opening 7 for the introduction of the material is advantageously formed by a circumferential interruption in the main duct 8, surrounded by a cup-shaped element 12 which is connected axially to the converging portion of the Venturi and can direct the dosed material into the narrow cross-sectioned portion of the Venturi.

The distributor 1 according to the invention also comprises an auxiliary duct 13 extending to connect a section 14 of the main duct 8 that is upstream of the Venturi, to a section 15 thereof that is downstream of the Venturi, thus constituting a duct which bypasses the Venturi duct. A portion of the air-flow generated by the fan 9 is thus tapped off by this duct 13 in the region of the section 14 and is introduced, downstream of the Venturi (section 15), into the air and seed mixture produced in the main duct.

The bypass duct 13, which is advantageously selected with a diameter such that the flow of air and the pressure in the main duct are not reduced, is preferably introduced into the main duct 8 directly at the output of the diverging portion 11c of the Venturi. The kinetic component of the air-seed mixture is thus suitably increased so as advantageously to increase the flow-rate of the material conveyed through the main duct.

In operation, by virtue of the reduction in pressure in the narrow cross-section of the Venturi duct, the dosed seed is drawn into the main duct 8, thus promoting mixing with the air-flow which is generated by the fan 9 and passes through the Venturi 11, and also promoting the dispersal of the seeds in the air-flow, so that it is possible to economize on the "mixing" portion which is normally made of corrugated pipe. Owing to the choking brought about in the main duct 8 by the Venturi, without a bypass duct the power deliverable by the fan would not be fully utilized but, by virtue of the provision of the bypass duct, some of the power of the fan is transferred to the auxiliary bypass air-flow which thus increases the kinetic component of the air-flow downstream of the Venturi, resulting in an increase in the hourly flow-rate of the air-seed mixture. With the distributor according to the invention, it is thus possible to increase the flow-rate of material for a given Venturi duct and fan, utilizing the power of the fan fully, by virtue of the provision of one or more bypass ducts of the type described above.

In a variant of the invention, shown in FIG. 2, two bypass ducts 13 are provided, each duct having the characteristics described in the previous embodiment, to which reference should be made for all of the relative details. In a preferred embodiment of this variant of the invention, both of the auxiliary ducts 13 are connected to the main duct 8 in the same sections of the main duct 8, upstream and downstream of the Venturi 11, respectively.

The invention thus solves the problem posed, affording the advantages indicated over known solutions. It should be noted in particular that, in known distributors having Venturi ducts of predetermined dimensions and size as well as fans with preselected characteristics, the flow-rate of material distributed can be increased by virtue of the provision of one or more bypass ducts according to the invention, which can recover some of the fan power that is blocked and not utilized because of the choking brought about by the Venturi. Tests carried out by the Applicant have shown, by virtue of the structure of the distributor according to the invention, an increase in flow-rate of from a minimum of 25% up to more than 100% relative to the value obtained in known applications, for given values of all of the other operating parameters, including the dimensions of the Venturi and the nominal power of the fan.

The invention claimed is:

1. A pneumatic distributor of at least one of granular and/or powdery materials, comprising:

a main distribution duct having a first end in the region of an air-flow which is injected into the duct under pressure, and a second end, the main duct having respective adjacent converging-diverging portions, with reference to the direction of the air-flow, defining a Venturi duct, dosing means for delivering a metered quantity of material into the main duct in the region of the narrow cross-section portion of the Venturi duct, for the mixing of the material into the air-flow and the entrainment of the mixture obtained towards the second end, and at least one auxiliary air-flow duct, bypassing the Venturi duct in order to connect a section of the main duct disposed upstream of the Venturi duct to a section of the main duct disposed downstream of the Venturi duct, a portion of the air-flow injected into the distribution duct being tapped off by said auxiliary duct in the region of the section disposed upstream of the Venturi duct and being introduced, at a section downstream of the Venturi duct, into the air and material mixture produced in the main duct.

2. The distributor according to claim 1, comprising at least two auxiliary ducts bypassing the Venturi duct.

3. The distributor according to claim 2 in which both of the auxiliary ducts are connected to the main duct in the same sections of the main duct, upstream and downstream of the Venturi duct, respectively.

4. The distributor according to claim 1, wherein the Venturi duct comprises a diverging portion and the auxiliary air-flow bypass duct is in flow communication with the main duct downstream of the Venturi duct at the output of the diverging portion of the Venturi duct, with reference to the direction of the air-flow.

5. The distributor according to claim 4, comprising at least two auxiliary ducts bypassing the Venturi duct.

* * * * *